March 13, 1962  H. SAURER ETAL  3,024,598
HYDROJET ENGINE FOR MARINE AND SUBMARINE PROPULSION
Filed Jan. 23, 1959  2 Sheets—Sheet 1

Inventors
HERMANN SAURER,
HANS VICTORA
by Mestern & Kollin
ATTORNEYS

March 13, 1962 H. SAURER ETAL 3,024,598
HYDROJET ENGINE FOR MARINE AND SUBMARINE PROPULSION
Filed Jan. 23, 1959 2 Sheets-Sheet 2

HERMANN SAURER
HANS VICTORA
*INVENTOR.*

3,024,598
HYDROJET ENGINE FOR MARINE AND
SUBMARINE PROPULSION
Hermann Saurer and Hans Victora, Frankfurt am Main, Germany, assignors to Berliner Maschinenbau AG. vorm. L. Schwartzkopff, Berlin, Germany
Filed Jan. 23, 1959, Ser. No. 788,556
Claims priority, application Germany Feb. 17, 1958
5 Claims. (Cl. 60—35.6)

Hydrojet engines of many different types, operating on the principle of expulsion of water or columns of water by direct gas expansion, are known. In such engines, the propellant gas is produced by combustion of fuels with air, and their operation involves various problems, such as control of the fluid-intake opening-and-closing means as well as of the gas valves. Other difficulties may arise from the method of applying the pressure of the propellant gas to the water ram which largely determines the gas/water boundary surface. Preparation of the propellant gas by combustion of fuels in air generally requires comparatively large combustion chambers, which are conveniently accommodated in the stream of water traversing the duct and result in a correspondingly high drag. Furthermore, particularly in the operation of submarine craft, intake of combustion air from the atmosphere is difficult and at times impossible.

In the present invention, the preparation of propellant gas for expulsion of the water jet or column is accomplished by combustion of fuels with high-grade liquid oxygen media. The above-mentioned problems, which require special water and gas control devices, are thus eliminated, so that the conversion of thermal energy into the kinetic energy of a water ram is achieved with utmost economy.

The device according to the invention will now be more fully described with reference to the accompanying drawing, but it should be understood that the drawing is provided by way of illustration and not of limitation and that many changes in the details may be made without departing from the spirit of the invention as claimed.

Figure 1:
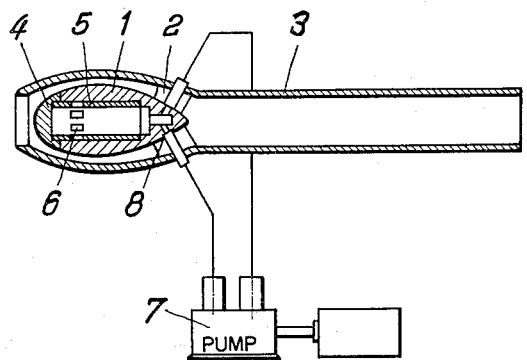
FIG. 1 is a diagrammatic axial cross-sectional view of an engine according to one embodiment of the invention.
Figure 1A:
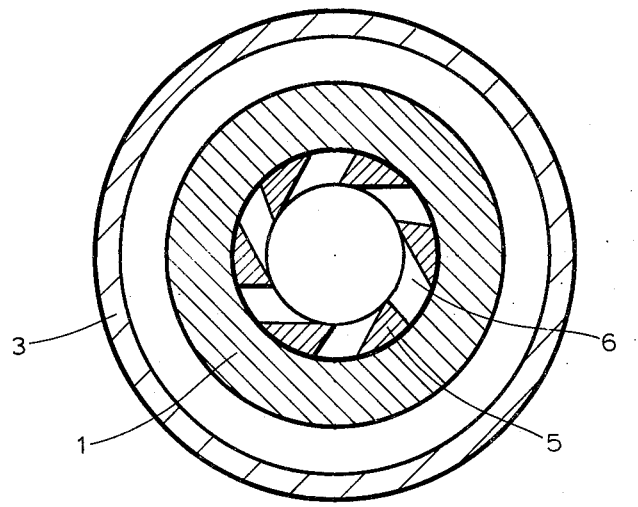
FIG. 1A is a transverse cross-sectional view of the combustion chamber of FIG. 1.

In FIGS. 1 and 1A we show a streamlined combustion-chamber housing 1 secured with clearance to a tubular casing forming a duct 3 by means of struts 2. The casing is formed with a fluid-intake opening at the left-hand or forward end thereof and is provided with a control member 4 capable of shutting off the water intake to duct 3 and also sealing the combustion chamber while the duct is filling, attached to a cylinder 5 capable of sliding in the combustion-chamber housing 1, which constitutes a fixed first body, towards the left as shown. This cylinder 5 is aligned axially with the combustion chamber and is provided with angularly disposed peripheral slits 6 which are exposed when the control member 4 slides to the left into water shut-off position, permitting the propellant gases to escape from the combustion chamber, the parts 4 and 5 constituting an axially shiftable second body which together with the first body 1 forms a common expandable combustion chamber.

Fuel and an oxidizer fluid such as oxygen are supplied by a pump 7, and are conducted through the conduit-forming struts 2 to the injection nozzles 8 in the combustion chamber. The conduit means forms passages with a cross-sectional area substantially smaller than the average cross-sectional area of the combustion chamber.

In order that the intermittently operating hydraulic opening-and-closing cycle may be executed at a relatively high frequency or, in other words, to permit a large number of ram pulses per unit time, the mass of the control member 4, which constitutes a valve, is kept to a minimum and the member is so designed that in the hydraulically closed position its valve surface engages a valve seat at the intake opening while allowing the propellant gases to escape at the extreme anterior end of the duct (right-hand side in FIG. 1), so that the water ram may be totally expelled. Furthermore, in order to reduce vibration and noise, the control member 4 is not carried into the hydraulically closed position by the combustion pressure, but by the force of compressed gases in the chamber. Upon combustion, therefore, the gas pressure reacts upon the already closed valve so that the forwardly escape of gas is avoided and valve-impact noises suppressed.

As a result of this arrangement, the propellant gases are released through the annular slit between combustion chamber 1 and control member 4, and bear upon the water ram over the annular cross-section between duct 3 and combustion chamber 1.

The slits 6 are disposed angularly to the periphery of cylinder 5 so that the gases emerge with spin about the axis of the combustion chamber.

Figure 2:
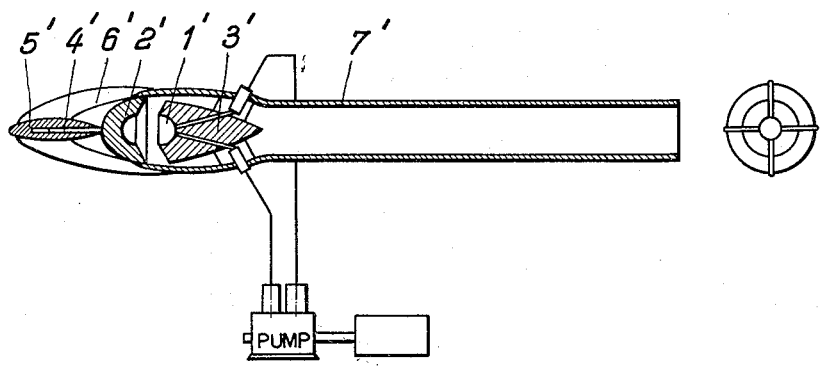
FIG. 2 is a diagrammatic view similar to FIG. 1 of another embodiment.
Figure 2A:
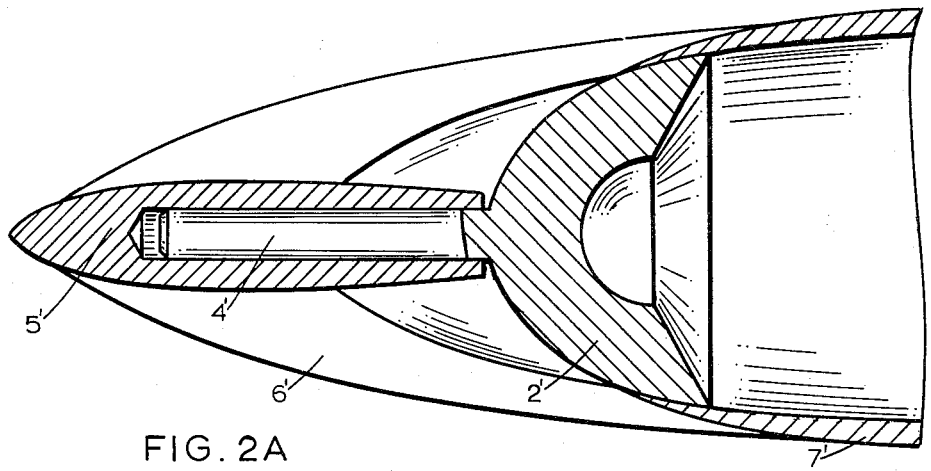
FIG. 2A is an enlarged detail view of the device of FIG. 2, illustrating the bearing elements thereof.

As may be seen in FIGS. 2 and 2A, in the hydrojet engine of this embodiment, the erstwhile combustion chamber is replaced by a mixing chamber 1' in which the fuel and oxygen delivered by the pump are mixed and ignited. The combustion takes place both in the mixing chamber and in the annular space between control member 2' and fairing 3'. The stem 4' of control member 2' is longitudinally displaceable in a bearing 5' attached by struts 6' to duct 7'. Otherwise, the structure of FIG. 2 is similar to that of FIG. 1.

In operation of the engine of FIG. 1, the control member 4 is opened by the ambient hydrostatic pressure to fill the duct 3 with water, at the same time closing the gas outlet slits 6. When the duct 3 is full, the pump 7 and injection nozzles 8 inject the propellant into the combustion chamber. As pressure builds up in the combustion chamber, the control member 4 is displaced into hydraulically closed position—to the left in FIG. 1—and, upon combustion, the propellant gases then swirl out of the slits 6 and act upon the water ram over the annular cross-section between combustion chamber 1 and duct 3. Expansion of the gases now accelerates the water ram occuping the duct 3, the jet thrust reacting upon control member 4 and duct 3.

After the expulsion of the water ram to the right (FIGS. 1 and 2), the cycle is repeated. The number of operating cycles per unit time is determined by the time required for the intake and expulsion processes.

The mode of operation for the engine of FIG. 2 is similar to that for the engine illustrated in FIG. 1, except that the closed combustion chamber of the latter is replaced by the mixing chamber 1' in which the injected propellant is thoroughly mixed and ignition is initiated. Combustion proper takes place in the annular gap between control member 2' and fairing 3'.

A hydrojet engine operating according to the present invention thus has the advantage of permitting the use of a small combustion chamber, disposed in the water stream, through the use of liquid propellants, thereby greatly diminishing losses due to hydrodynamic drag. In addition, extraordinarily favorable cooling conditions are provided, so that high combustion temperatures can be achieved without operational disadvantages.

The gas-water valve member allows the propellant gases to escape close to the valve seat of the duct, thus ensuring total expulsion of the water ram. By directing the propellant gases and applying them to the water ram in this manner, a favorable gas-water boundary surface is achieved, a decisive factor in economical operation of an engine of this kind. Finally, the use of liquid propellants (fuel plus oxygen) is especially advantageous in submarine propulsion, since liquid combustion media are much less bulky than gaseous ones such as air.

What we claim is:

1. A hydrojet engine comprising a tubular casing formed with a fluid-intake opening at one extremity thereof and an exhaust duct provided with a fluid-ejection opening at the other extremity thereof, a first body disposed fixedly in said casing with clearance, thereby defining with said casing a space interconnecting said openings, a second body aligned with said first body and axially shiftable within said casing in the direction of said intake opening, said bodies being formed with facing concavities constituting a common expandable combustion chamber centered on the axis of said casing, said casing being provided with a valve seat at said intake opening adapted to engage said second body, conduit means for the admission of fuel and oxidizer fluids terminating in said first body and communicating with said chamber, said conduit means forming at least one passage with a cross-sectional area substantially smaller than the average cross-sectional area of said chamber, and feed means for intermittently supplying predetermined quantities of fuel and oxidizer fluids to said chamber through said conduit means.

2. In a hydrojet engine, in combination, a tubular casing formed with a fluid-intake opening at one extremity thereof and with an exhaust duct provided with a fluid-ejection opening at the other extremity thereof, a generally cylindrical body disposed in and secured to said casing with clearance, thereby defining with said casing an annular space interconnecting said openings, said body being provided with a central combustion chamber opening in the direction of said intake opening, a valve member axially shiftable in said casing and capping said chamber, said casing being formed with a valve seat at said intake opening adapted to engage said valve member, a fuel-injector nozzle and an oxidizer-injector nozzle opening into said chamber, said nozzles having a combined cross-sectional area substantially less than the average cross-sectional area of said chamber, and feed means for periodically supplying predetermined quantities of fuel and oxidizer fluids under pressure to respective ones of said nozzles whereby said fuel and oxidizer fluids, prior to ignition, expand into said chamber to shift said valve member into engagement with said valve seat while simultaneously unblocking said chamber.

3. In a hydrojet engine, in combination, a tubular casing formed with a fluid-intake opening at one extremity thereof and with an exhaust duct provided with a fluid-ejection opening at the other extremity thereof, a generally cylindrical body disposed in and secured to said casing with clearance, thereby defining with said casing an annular space interconnecting said openings, said body being provided with a central, generally cylindrical combustion chamber opening in the direction of said intake opening, a valve member axially shiftable in said casing and capping said chamber, said casing being formed with a valve seat at said intake opening adapted to engage said valve member, a sleeve secured to said valve member slidably received in said chamber, said sleeve being provided with at least one outlet opening tangential to a circle concentric with said chamber, a fuel injector nozzle and an oxidizer-injector nozzle opening into said chamber, said nozzle having a combined cross-sectional area substantially less than that of said chamber, and feed means for periodically supplying predetermined quantities of fuel and oxidizer fluids to respective ones of said nozzles, whereby said valve member is shifted into engagement with said valve seat upon combustion of said fuel and oxidizer fluids in said chamber to close said inlet opening and to interconnect said space and said chamber via said outlet opening.

4. In a hydrojet engine, in combination, a tubular casing formed with a fluid-intake opening at one extremity thereof and with an exhaust duct provided with fluid-ejection opening at the other extremity thereof, a generally cylindrical body disposed in and secured to said casing with clearance, thereby defining with said casing an annular space interconnecting said openings, said body being provided with a central forwardly facing recess opening in the direction of said intake opening, a valve member axially shiftable in said casing and provided with a rearwardly facing recess registering with said forwardly facing recess and forming a combustion chamber therewith, said casing being formed with a valve seat at said intake opening adapted to engage said valve member, a fuel injector nozzle and an oxidizer-injector nozzle opening into said chamber, said nozzles having a combined cross-sectional area substantially less than the average cross-sectional area of said chamber, and feed means for periodically supplying predetermined quantities of fuel and oxidizer fluids under pressure to respective ones of said nozzles whereby said fuel and oxidizer fluids, prior to ignition, expand into said chamber to shift said valve member into engagement with said valve seat while simultaneously separating said recesses whereby combustion ensues in the gap between said recesses.

5. A process for operating a hydrojet engine having an expandable reaction chamber with an open thrust tube whose forward end is closable by a portion of said chamber upon expansion thereof, comprising the steps of admitting water into said tube through the forward end thereof, injecting a combustible mixture under pressure into said reaction chamber, thereby expanding said chamber to block said forward end, and thereafter igniting said mixture within the expanded chamber to drive the water out of said tube through the other end thereof.

References Cited in the file of this patent

UNITED STATES PATENTS

| 2,443,186 | Foulks | June 15, 1948 |
| 2,637,161 | Tschinkel | May 5, 1953 |

FOREIGN PATENTS

| 484,609 | Italy | Sept. 17, 1953 |